United States Patent
Bowen et al.

(10) Patent No.: US 11,453,444 B2
(45) Date of Patent: Sep. 27, 2022

(54) VEHICLE PROTECTION SYSTEM TO SECURE A PROTECTIVE COVERING TO AN AXLE OF A VEHICLE

(71) Applicant: RV-De-Fender, LLC, Sandy, UT (US)

(72) Inventors: Gregory Adam Bowen, Sandy, UT (US); Todd Ryan Smith, Sandy, UT (US); Zackary Donald Patterson, Harrisville, UT (US)

(73) Assignee: RV-De-Fender, LLC, Sandy, UT (US)

( * ) Notice: Subject to any disclaimer, the term of this patent is extended or adjusted under 35 U.S.C. 154(b) by 0 days.

(21) Appl. No.: 17/111,334

(22) Filed: Dec. 3, 2020

(65) Prior Publication Data
US 2022/0177043 A1    Jun. 9, 2022

(51) Int. Cl.
| | |
|---|---|
| *B62D 25/16* | (2006.01) |
| *B62D 65/16* | (2006.01) |
| *B60P 3/32* | (2006.01) |
| *B62D 63/06* | (2006.01) |
| *B60R 19/00* | (2006.01) |

(52) U.S. Cl.
CPC .......... *B62D 25/163* (2013.01); *B62D 65/16* (2013.01); *B60P 3/32* (2013.01); *B60R 2019/002* (2013.01); *B62D 63/06* (2013.01)

(58) Field of Classification Search
None
See application file for complete search history.

(56) References Cited

U.S. PATENT DOCUMENTS

| | | | | |
|---|---|---|---|---|
| 1,454,738 A | * | 5/1923 | Hilton ................. | B62D 25/186 280/847 |
| 1,488,136 A | * | 3/1924 | Simpson .............. | B62D 25/163 280/847 |
| 2,771,304 A | * | 11/1956 | La Pere .............. | B62D 25/188 280/847 |
| 2,947,375 A | * | 8/1960 | Lehmann ............. | B62D 25/182 280/847 |

(Continued)

FOREIGN PATENT DOCUMENTS

| | | | |
|---|---|---|---|
| CN | 108609057 A | * 10/2018 | |
| EP | 1314633 A1 | * 5/2003 | ........... B62D 25/186 |

(Continued)

OTHER PUBLICATIONS

International Searching Authority, International Search Report and the Written Opinion, dated Mar. 30, 2022.

*Primary Examiner* — James A Shriver, II
*Assistant Examiner* — Ian Bryce Shelton
(74) *Attorney, Agent, or Firm* — Kirton McConkie; Brian Tucker

(57) ABSTRACT

A system for protecting the body and frame of a vehicle from flying debris, particularly during a tire blowout includes a mounting apparatus configured to secure a protective shield, which may be a protective plate and/or fender, to an axle of a vehicle. In embodiments, the protective plate may be mounted to the axel via a mounting apparatus, and the fender may further be mounted to the mounting apparatus and/or protective plate. In some embodiments, the protective plate may be mounted directly to the axel, and the fender may further be mounted to the protective plate, whereby the plate may serve as the mounting apparatus.

14 Claims, 14 Drawing Sheets

(56) References Cited

U.S. PATENT DOCUMENTS

| | | | | |
|---|---|---|---|---|
| 3,560,021 | A * | 2/1971 | Watson | B62D 25/188 298/1 SG |
| 5,169,167 | A * | 12/1992 | Willson | B62D 25/186 280/157 |
| 5,387,001 | A * | 2/1995 | Hull | B60P 3/127 280/415.1 |
| 5,533,781 | A | 7/1996 | Williams | |
| 5,836,399 | A * | 11/1998 | Maiwald | B62D 25/186 280/157 |
| 6,658,984 | B2 * | 12/2003 | Zonak | F41H 7/042 89/36.02 |
| 6,802,517 | B1 * | 10/2004 | Wuthrich | B62D 25/18 280/157 |
| 8,052,200 | B2 | 11/2011 | Bharani et al. | |
| 8,657,350 | B2 | 2/2014 | Cabo | |
| 8,770,655 | B1 * | 7/2014 | Godby | B62D 25/163 280/848 |
| 9,637,176 | B2 * | 5/2017 | Heino | B62D 25/186 |
| 10,323,909 | B2 | 6/2019 | Carton et al. | |
| 2007/0182151 | A1 * | 8/2007 | Aulabaugh | B62D 25/161 280/849 |
| 2008/0006742 | A1 * | 1/2008 | Guering | B62D 25/168 244/121 |
| 2011/0080019 | A1 * | 4/2011 | Castillo | B62D 25/16 296/180.1 |
| 2012/0080908 | A1 * | 4/2012 | Wellman | B62D 25/186 293/11 |
| 2013/0313389 | A1 * | 11/2013 | Lodi | B62D 25/16 248/214 |
| 2015/0299982 | A1 * | 10/2015 | Angelo | E02F 9/0858 280/154 |
| 2016/0128278 | A1 * | 5/2016 | Rau | B62D 25/16 293/58 |
| 2016/0288843 | A1 | 10/2016 | Fujimoto et al. | |
| 2017/0334486 | A1 * | 11/2017 | Plebani | B62D 25/168 |
| 2020/0262498 | A1 * | 8/2020 | Bender | B62D 25/168 |

FOREIGN PATENT DOCUMENTS

| | | | | |
|---|---|---|---|---|
| FR | 574516 | A * | 7/1924 | |
| FR | 2847876 | A1 * | 6/2004 | ........... B62D 25/186 |
| GB | 2043006 | A * | 10/1980 | ........... B62D 25/168 |
| KR | 19980036635 | U * | 9/1998 | |
| WO | WO-2014047093 | A1 * | 3/2014 | ............ B62D 25/18 |
| WO | WO-2016075573 | A1 * | 5/2016 | ........... B62D 25/161 |
| WO | WO-2017125904 | A1 * | 7/2017 | ............. B60R 19/00 |
| WO | WO-2017204715 | A1 * | 11/2017 | ............. B62D 25/16 |
| WO | WO-2018229048 | A1 * | 12/2018 | ........... B62D 25/163 |

* cited by examiner

VEHICLE PROTECTION SYSTEM TO SECURE A PROTECTIVE COVERING TO AN AXLE OF A VEHICLE

RELATED APPLICATION

N/A

BACKGROUND

The embodiments herein relate generally to vehicles and vehicle protection systems. In specific embodiments, the disclosed subject matter relates to devices and methods for protecting non-motorized vehicles, such as trailers or RVs.

Vehicles, and in particular recreational vehicles (RVs), can suffer damage from flying debris, for example from a tire blowout. In such instances, debris can project at a high rate of speed to contact and damage the frame and body of the vehicle, and may further create a road hazard. As such, an improved system is needed.

SUMMARY

Disclosed is a system for protecting the body and frame of a vehicle from flying debris, particularly debris from a tire blowout.

In embodiments, the vehicle may be a non-motorized vehicle which may be pulled by a motorized vehicle, such as an RV trailer, toy hauler, 5$^{th}$ wheel, travel trailer, and the like.

In embodiments, the disclosed system may comprise a mounting apparatus configured to secure a protective shield, which may be a protective plate and/or fender, to an axle of a vehicle. In embodiments, the protective plate may be mounted to the axle via a mounting apparatus, and the fender may further be mounted to the mounting apparatus and/or protective plate. In some embodiments, the protective plate may be mounted directly to the axle, and the fender may further be mounted to the protective plate, whereby the plate may serve as the mounting apparatus.

In embodiments, the mounting apparatus may comprise a telescoping assembly including an inner tube slidably mounted to an outer tube in one of a plurality of locking positions, wherein the outer tube of the telescoping assembly may be configured to couple to the fender, and the inner tube of the telescoping assembly may be configured to couple to the axle of the vehicle, thereby securing the fender to the axle of the vehicle.

In an alternative embodiment, the mounting apparatus may comprise a pair of bracket plates, which may also be protective plates ("protective plate bracket"), disposed around the axle of the vehicle and configured to permit attachment of the fender thereto, wherein the fender is secured in a position that extends around the tire on the axle of the vehicle.

In further embodiments, the disclosed system may comprise a protective plate bracket, which may comprise a semi-circular or partial-circular cutout configured to wrap around the axle. In embodiments, the protective plate bracket may comprise at least two pieces, with complementary partial circular cutouts, configured to encircle the axle when coupled together via various coupling elements. In further embodiments, a U-bolt mount, a drum brake plate and/or the brake plate axle bracket may be utilized for further securing the protective plate bracket to the axle. In yet further embodiments, the protective plate bracket may have a 'wing' design. In other embodiments, the protective plate may have a semi-circular design.

According to various embodiments, the disclosed system may be configured to accommodate all variations of axle positions, sizes and additional hardware like drum brake assemblies, single, tandem, and/or triple axle trailers, etc. The disclosed system may also include adjustable mounting positions to accommodate different vehicles. The disclosed system may further allow for independent articulation of each axle/wheel and tire to maintain consistent spacing of all protective devices (e.g. wing bracket, fender) and to provide the same protection regardless of the position or the axle and speed of the wheel and tire across all types of terrain.

The disclosed system may protect the vehicle from damage during a blowout of a tire on the axle, including from flying debris in a tire blowout. This may protect the exterior of the vehicle (e.g. trailer) from being damaged from debris, and may reduce or eliminate the potential for additional debris to be torn off the exterior of the vehicle, and/or strike other vehicles on the road. Thus, the disclosed system may significantly reduce repair costs and may further prevent accident(s) that may be caused by substantially containing such flying debris to prevent it from creating a road hazard.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
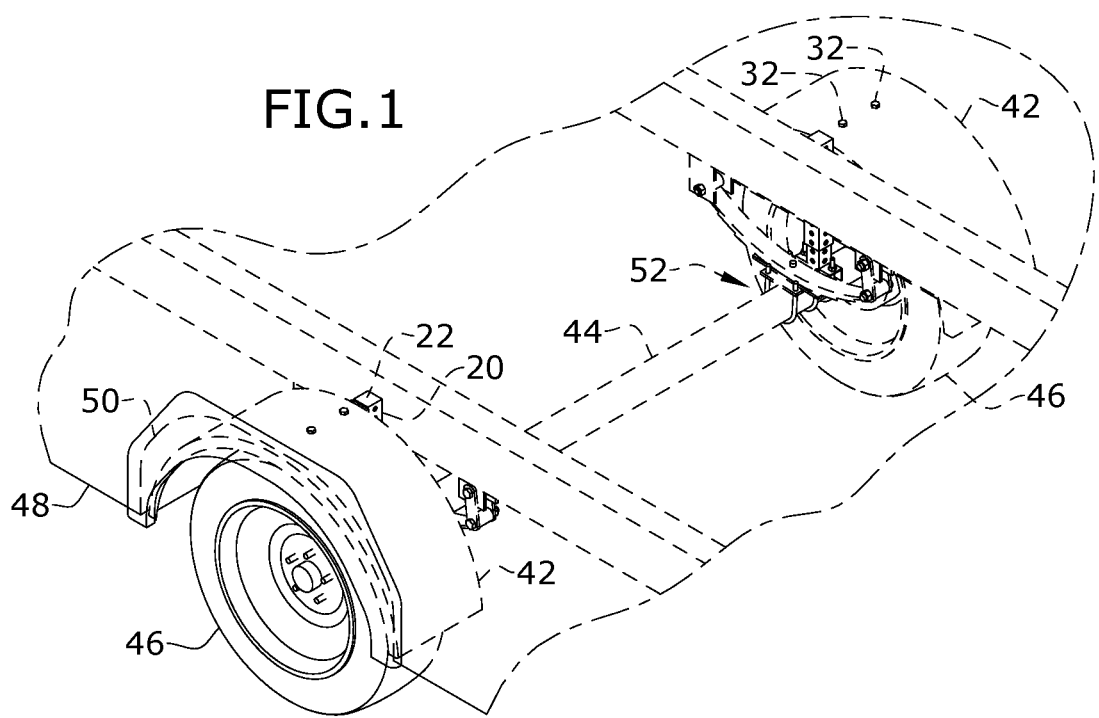
FIG. 1 depicts a perspective view of certain embodiments of the mounting apparatus shown in use on a vehicle.
Figure 2:
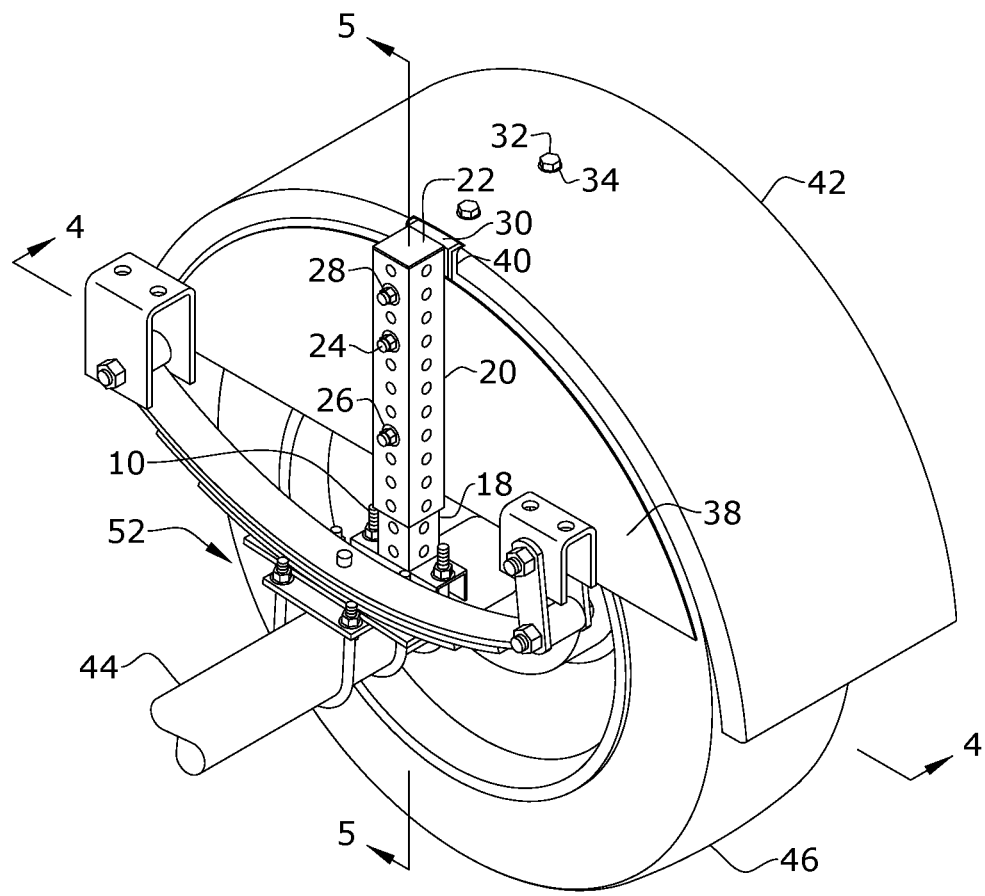
FIG. 2 depicts a perspective view of certain embodiments of the mounting apparatus shown in use on a vehicle.

In certain embodiments, the mounting apparatus is configured to secure a fender covering to the axle of a vehicle so that the fender extends around one of the tires of the vehicle. In one embodiment, mounting apparatuses are used to secure fenders to the axles of the vehicle to extend around all tires of the vehicle individually. This protects the body and frame of the vehicle from flying debris from tire blowouts and/or road debris.

According to various embodiments, disclosed is a vehicle protection system for mounting at least one protective element to an axle of a vehicle. In embodiments, the system may comprise a mounting apparatus configured to mount to an axle 44 of a vehicle 48, in order to secure a protective shield to the axle at an inner (i.e. rear or back) side of the tire. In embodiments, the mounting apparatus may be structured to secure a protective element or shield around the tire, which may protect the vehicle from flying debris. In some embodiments, the protective element may itself mount to the axle. In embodiments, the protective element may be a protective back plate (plate bracket) which is configured to cover at least a portion of the inner side face (i.e. rear side face) of the tire 46. This may be at least about 10% of the inner side face, or about 30%, about 40%, or about 45%, or more of the inner tire face, according to various embodiments. In some further embodiments, the protective element may be a fender. In embodiments, the fender may cover approximately 50% of the top tire area. In yet further embodiments, the fender may mount to the protective plate, to the mounting apparatus, or both. For example, in embodiments where the protective plate is mounted to the mounting apparatus, the mounting apparatus together with the protective plate may be structured to support the fender, thus providing a secondary protective element. In other embodiments, the protective plate may mount to the axle, and further be structured to support the fender. The protective plate may have various designs, such as a circular or "half-moon" design, a "wing" or partial wing design, according to various embodiments. Additionally, the protective plate may comprise one, or multiple plate pieces, according to various embodiments. In some embodiments, the vehicle 48 may be a non-motorized vehicle, such as an RV trailer, toy hauler, 5$^{th}$ wheel, travel trailer, and the like, which may be pulled by a motorized vehicle. However, it shall be appreciated that the mounting apparatus can be used with any vehicle comprising a wheel and axle assembly.

In one embodiment, as depicted in FIGS. 1-5, the mounting apparatus may be coupled to axle 44 of vehicle 48, such as an RV trailer in an over slung suspension assembly 52. The mounting apparatus may secure a protective back plate 38, and a fender 42 to axle 44 so that back plate 38 and fender 42 extend around tire 46, with back plate 38 covering a portion of the back side of the tire 46. As shown, back plate 38 may have a semi-circular or "half-moon" configuration. This installation is completed using multiple mounting apparatuses so that each tire 46 of vehicle 48 is positioned within a corresponding back plate 38 and fender 42.

In embodiments, the mounting apparatus may generally comprise a telescoping assembly comprising outer tube 20 slidably mounted to inner tube 18. A cap 22 may be coupled to the top of outer tube 20. In one embodiment, the mounting apparatus may also comprise an axle perch plate 16 and U-bolt 10.

Figure 3:
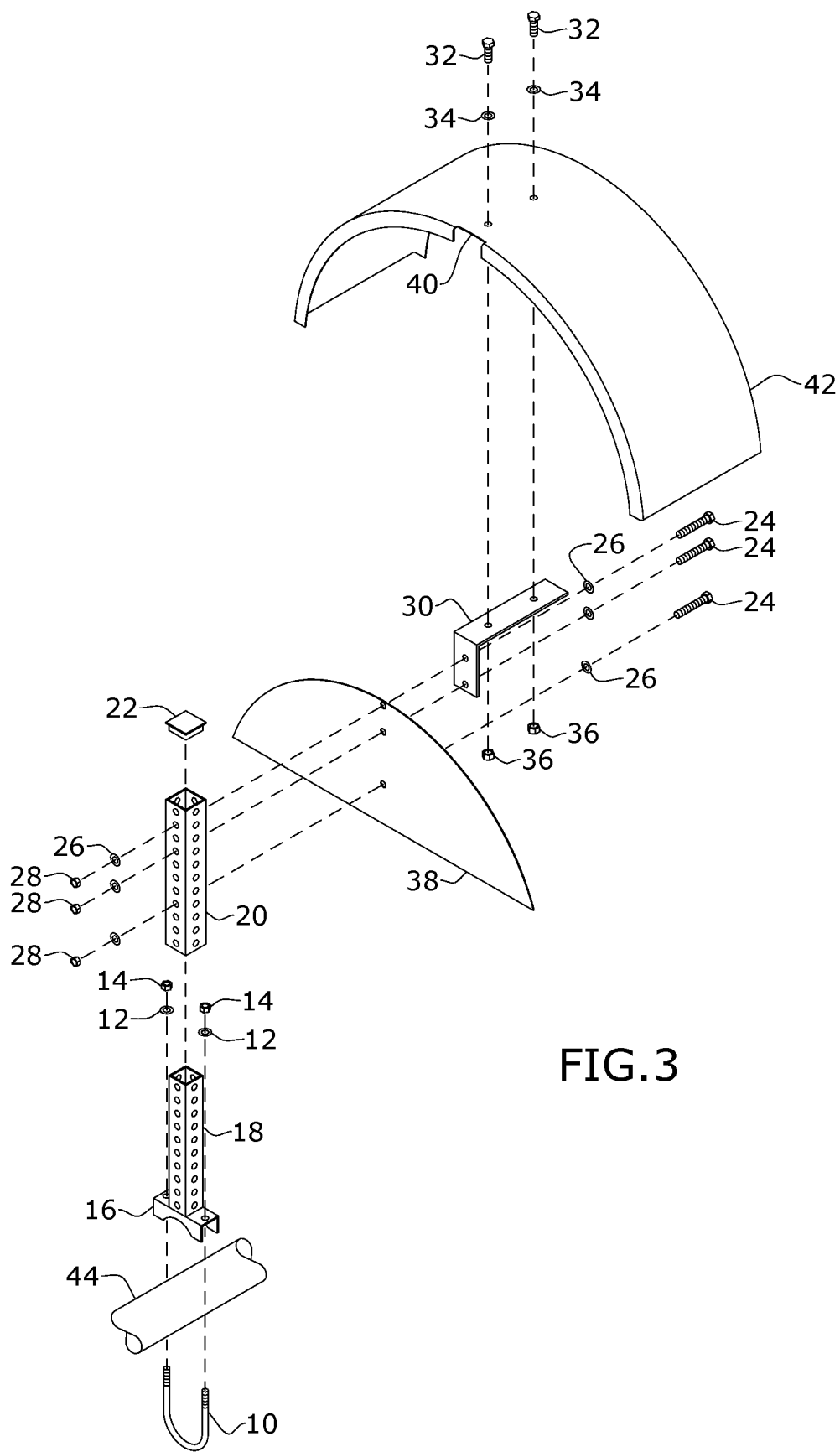
FIG. 3 depicts an exploded view of certain embodiments of the mounting apparatus.
Figure 4:
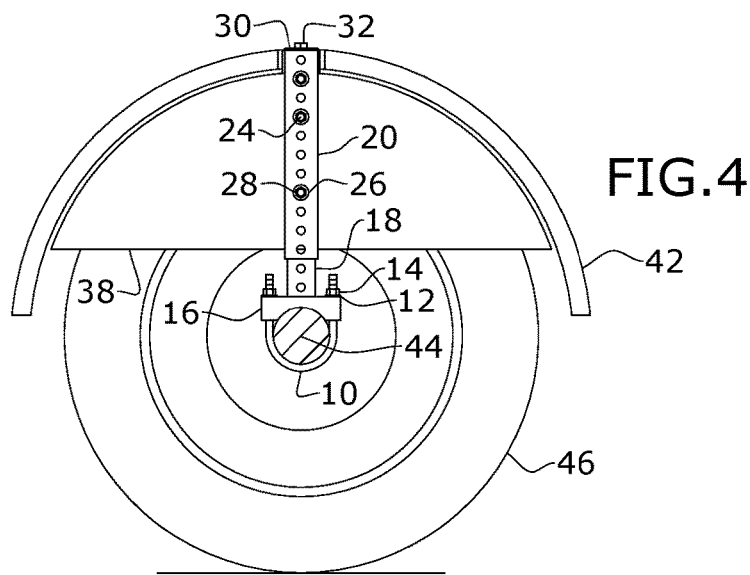
FIG. 4 depicts a section view of certain embodiments of the mounting apparatus, taken along line 4-4 in FIG. 2.
Figure 5:
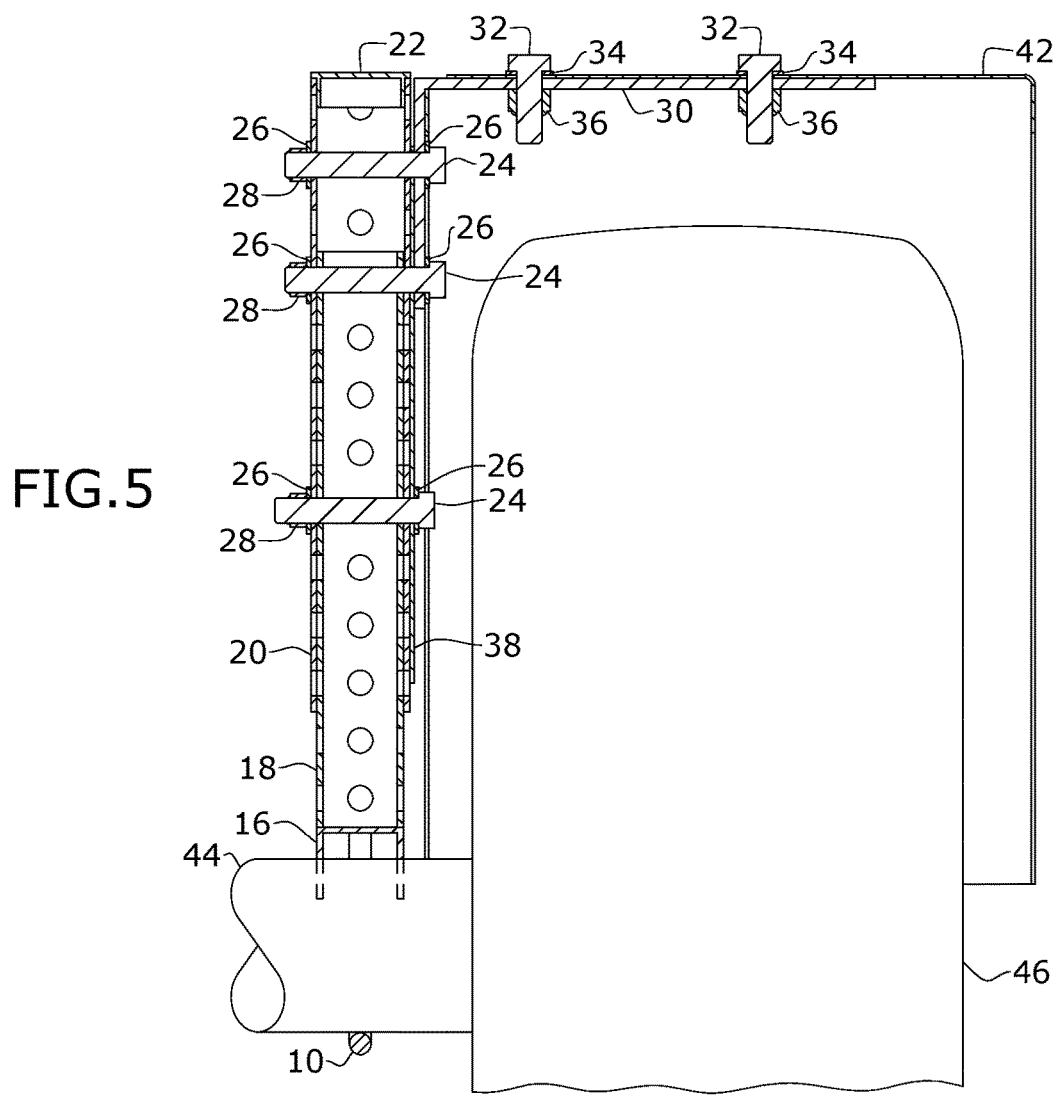
FIG. 5 depicts a section view of certain embodiments of the mounting apparatus, taken along line 5-5 in FIG. 2.

In embodiments, axle perch plate 16 may be coupled to a bottom end of inner tube 18 and is configured to sit on axle 44. U-bolt 10 may extend around axle 44 from the bottom and through a pair of openings in axle perch plate 16. U-bolt 10 may be secured to axle perch plate 16 by U-bolt washers 12 and U-bolt nuts 14. As best depicted in FIG. 3, outer tube 20 may be slidably adjusted to inner tube 18 in one of a plurality of locking positions to achieve a desired height. Outer tube 20 may be configured to attach to back plate 38 and fender 42 as shown.

In embodiments as best depicted in FIGS. 2-5, L-bracket 30 may couple back plate 38 and fender 42 together. In one embodiment, fender 42 may comprise a slot 40 for receiving L-bracket 30 therein. L-bracket 30 may connect to fender 42 by L-bracket bolts 32, L-bracket washers 34 and L-bracket nuts 36. Back plate 38 may be coupled to L-bracket 30 and corresponding openings in outer tube 20 and inner tube 18 by height adjustment bolts 24, height adjustment washers 26, and height adjustment nuts 28. Thus, the mounting apparatus may couple the back plate 38 and fender 42 to axle 44, and further secure back plate 38 and fender 42 around tire 46 within an inner fender well 50 of vehicle 48.

Figure 6:
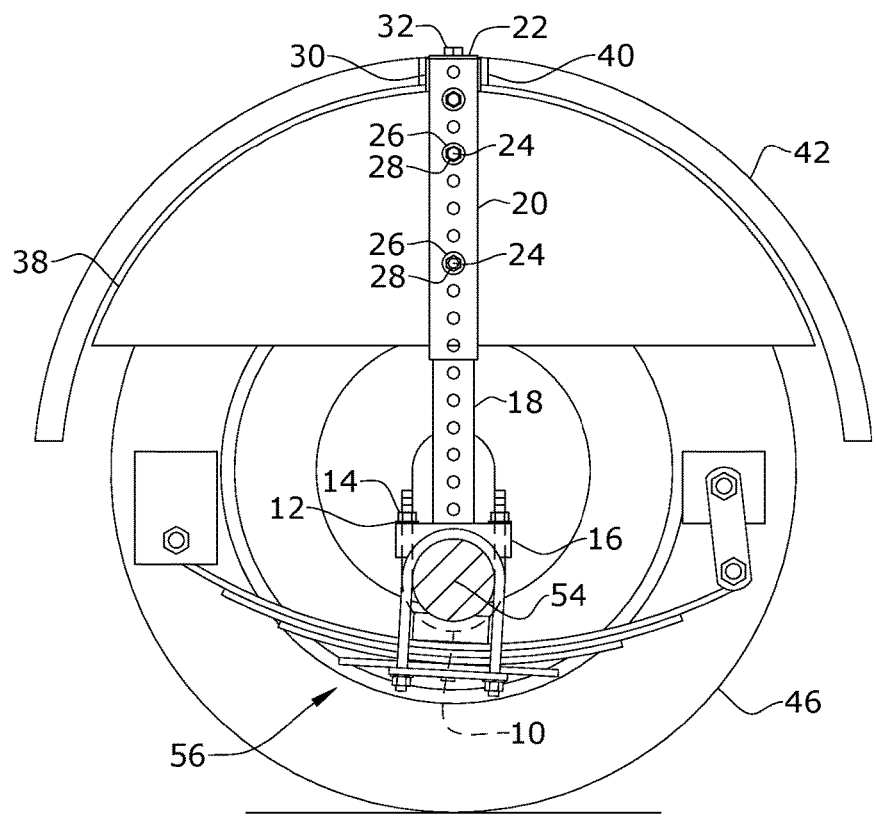
FIG. 6 depicts a perspective view of certain embodiments of the mounting apparatus illustrating an alternate installation on the vehicle.
Figure 7:
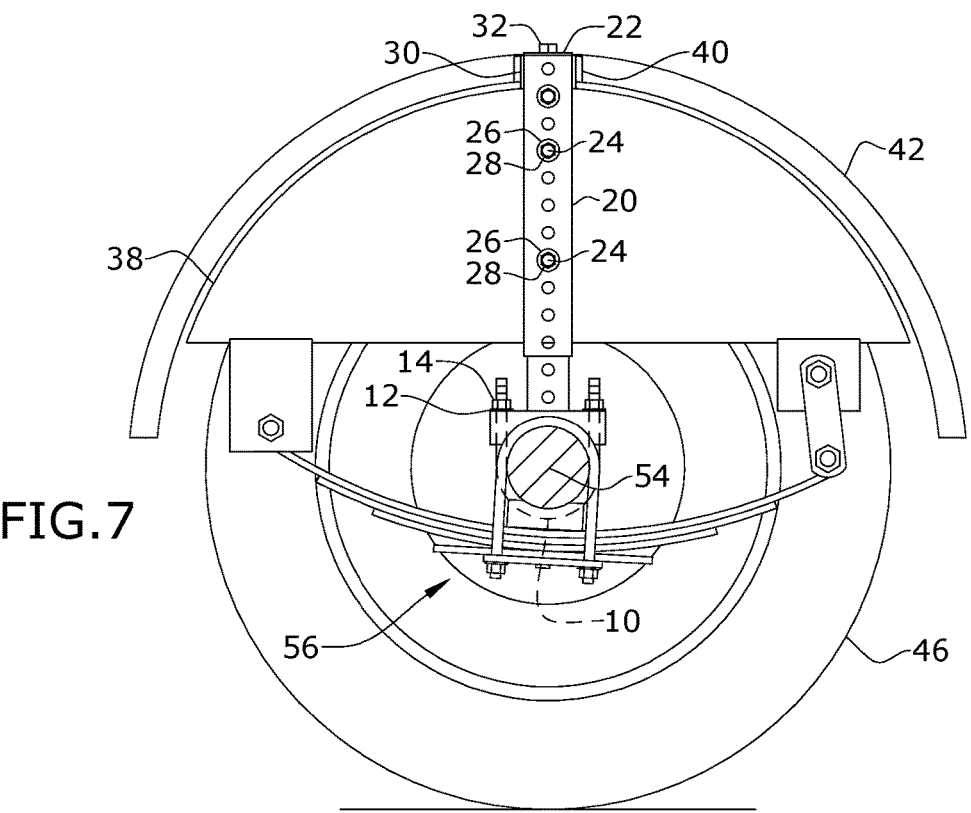
FIG. 7 depicts a perspective view of certain embodiments of the mounting apparatus illustrating the alternate installation on the vehicle.
Figure 8:
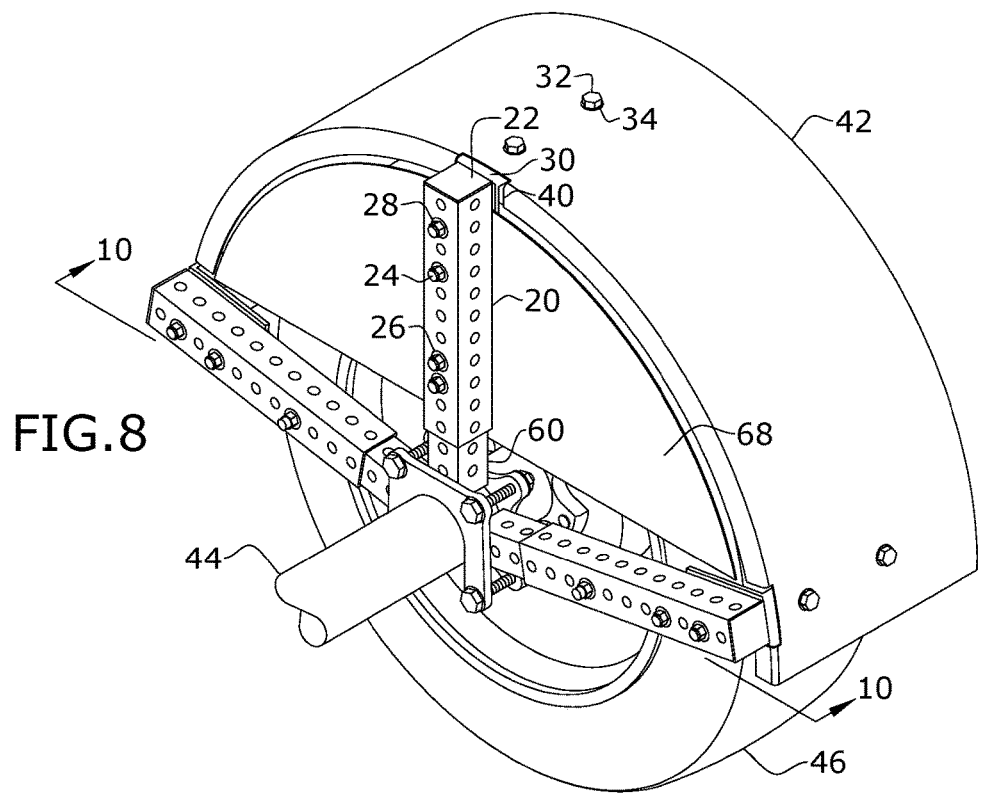
FIG. 8 depicts a top perspective view of a first alternate embodiment of the mounting apparatus shown in use on a vehicle with a slip-on bracket.

In embodiments as depicted in FIGS. 6-7, the mounting apparatus can be used to secure back plate 38 and fender 42 to vehicle 48 in an under slung suspension 56 and drop axle 54 configuration. The components of the mounting apparatus may be secured together in the same manner as previously described.

It shall be appreciated that the number and type of components used in the mounting apparatus to secure the back plate and fender to the vehicle can vary in alternative embodiments. Any type and number of brackets, fasteners, clamps or other components can be used.

In an alternative embodiment as depicted in FIGS. 8-11, a first alternate mounting apparatus is configured to secure fender 42 and alternate back plate 68 to axle 44 of the vehicle.

In this embodiment, the first alternate mounting apparatus may generally comprise three telescoping assemblies, axle slot bracket 58 and axle bracket 70. In one embodiment as depicted in FIGS. 8-11, axle slot bracket 58 and axle bracket 70 may be disposed around axle 44 of vehicle 48. Mechanical fasteners such as bracket bolts 62, bracket washers 66 and axle nuts 64 are used to couple axle slot bracket 58 and axle bracket 70 together.

In one embodiment, each telescoping assembly comprises alternate inner tube 60 slidably mounted to outer tube 20 in one of a plurality of locking positions. In one embodiment, each alternate inner tube 60 of the telescoping assemblies may be welded to axle slot bracket 58 or connected together by another fastening component. The three telescoping assemblies may be coupled to corresponding L-brackets 30 used to couple fender 42 and alternate back plate 68 together.

Figure 9:
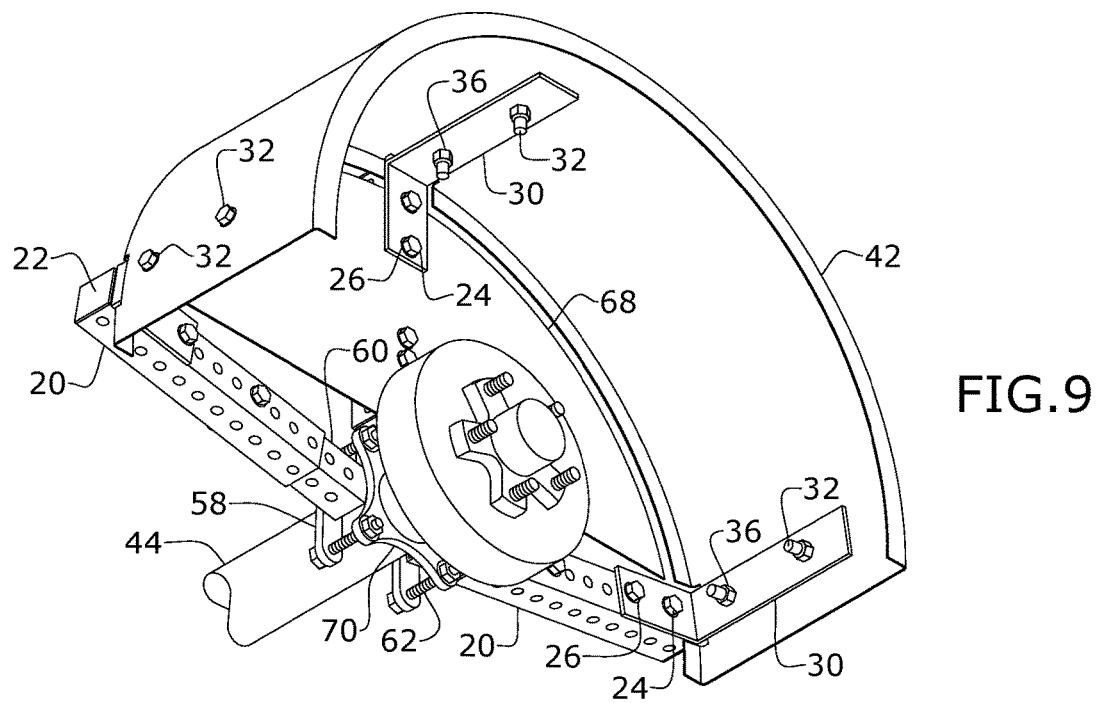
FIG. 9 depicts a bottom perspective view of the first alternate embodiment of the mounting apparatus with the slip-on bracket.
Figure 10:
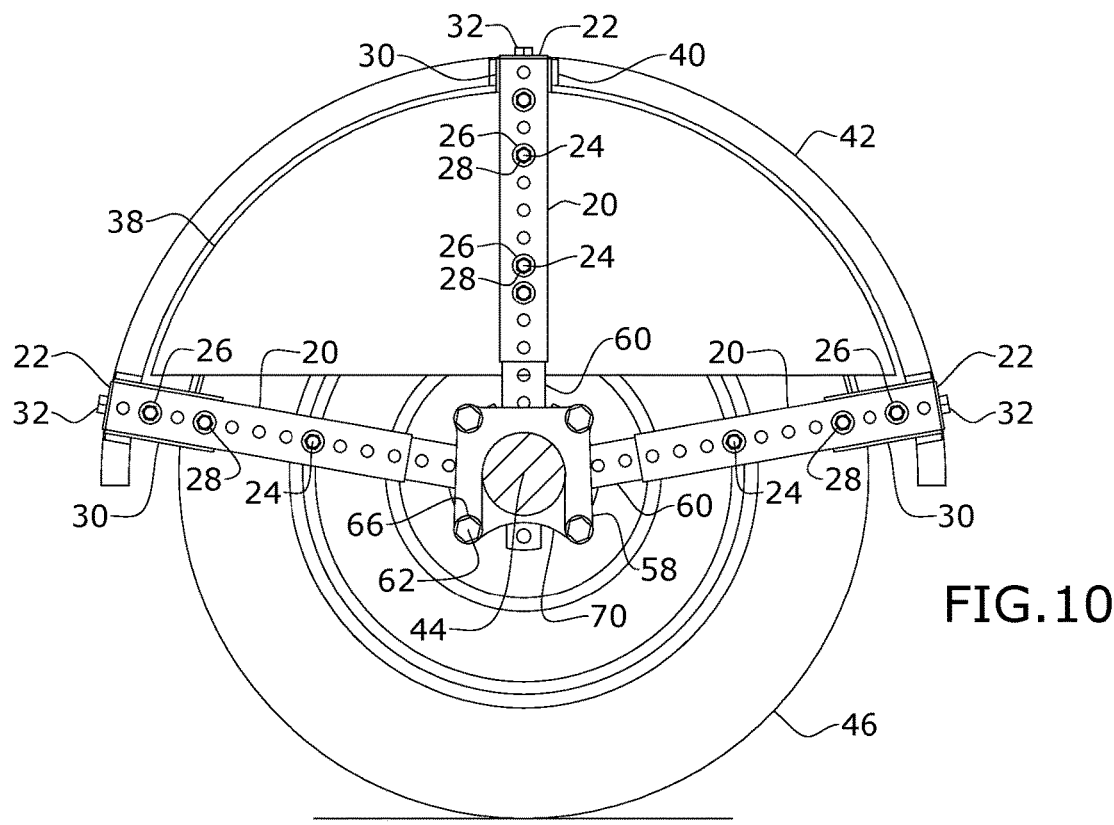
FIG. 10 depicts a section view of the first alternate embodiment of the mounting apparatus, taken along line 10-10 in FIG. 8.
Figure 11:
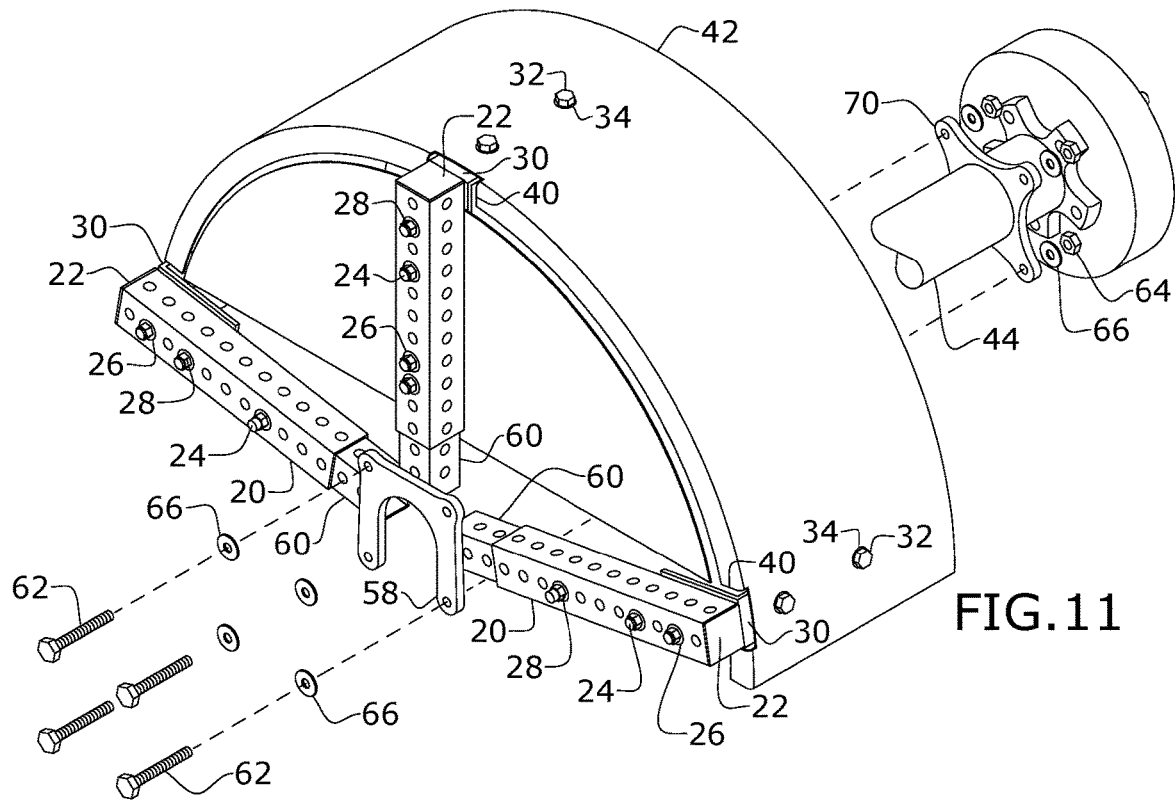
FIG. 11 depicts an exploded view of the first alternate embodiment of the mounting apparatus.
Figure 12:
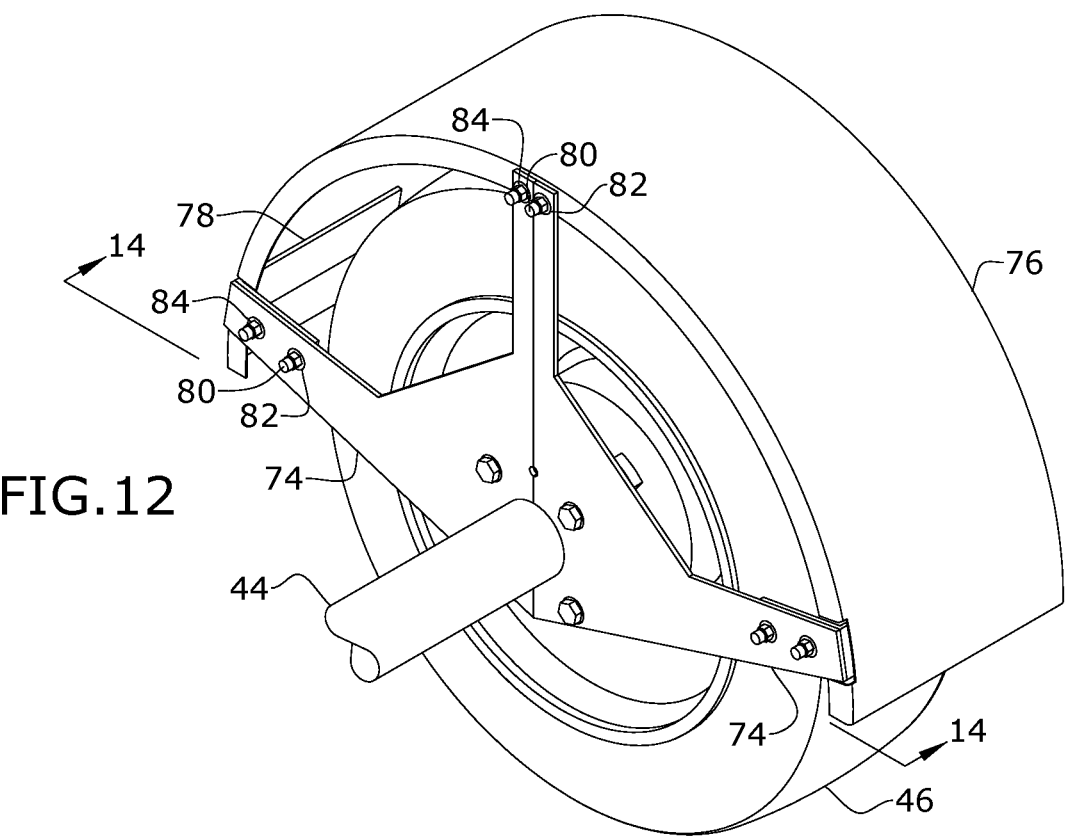
FIG. 12 depicts a perspective view of a second alternate embodiment of the mounting apparatus.

In embodiments as best depicted in FIG. 9, top L-bracket 30 may be coupled to fender 42 by bolts, washers and nuts. Top L-bracket 30 may be coupled to alternate back plate 68 and an upright telescoping assembly using fasteners such as washers, bolts and nuts. A pair of side L-brackets 30 may be coupled to fender 42 and a pair of side telescoping assemblies by washers, bolts and nuts.

In this assembly, the first alternate mounting apparatus secures fender 42 and alternate back plate 68 around tire 46. It shall be appreciated that each telescoping assembly can be slidably adjusted and locked into the desired locking position by mechanical fasteners to enable the first alternate mounting apparatus to accommodate the height of the particular axle 44 and tire 46 of the vehicle.

In an alternative embodiment as depicted in FIGS. 12-15, a second alternate embodiment may comprise a back plate, which may also serve as a mounting apparatus to secure alternate fender 76 to axle 44 of the vehicle. In one embodiment, the second alternate embodiment may generally comprise a pair of back plates 74 and axle bracket 70 that extend around axle 44 of the vehicle. In one embodiment, the pair of back plates 74 and axle bracket 70 are disposed around axle 44 and are secured together by axle bracket bolts 86, axle bracket washers 88 and axle bracket nuts 90.

Figure 13:
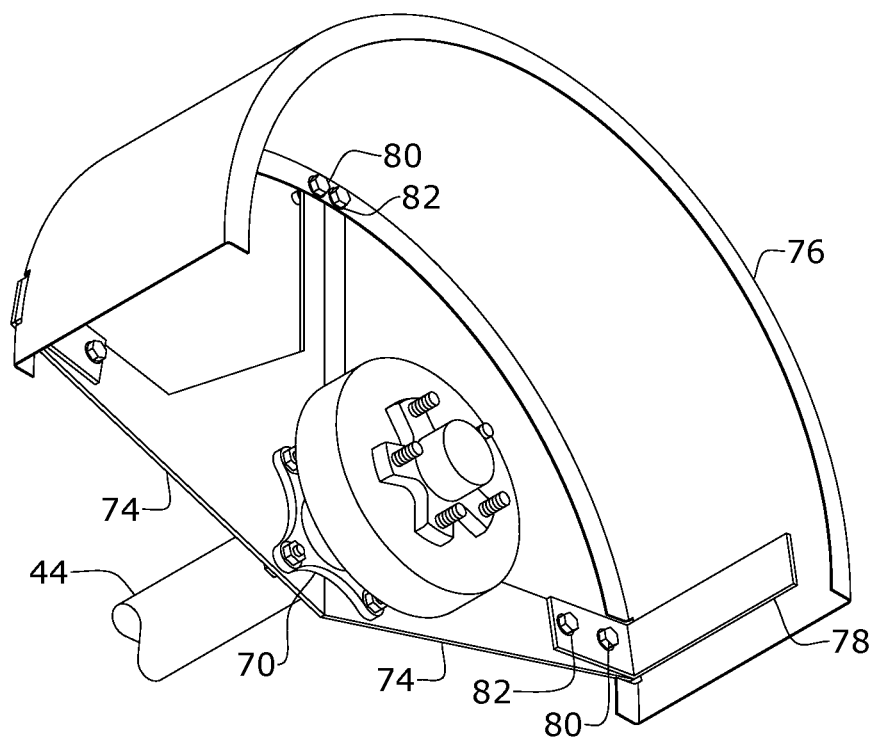
FIG. 13 depicts a bottom perspective view of the second alternate embodiment of the mounting apparatus.
Figure 14:
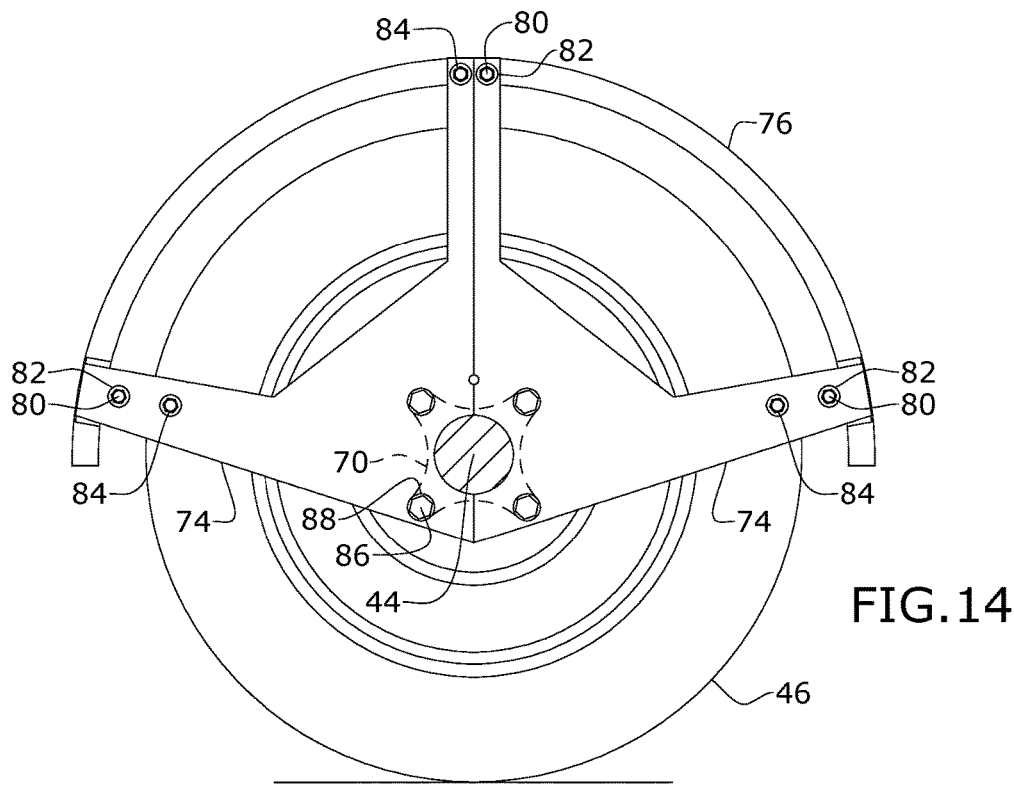
FIG. 14 depicts a section view of the second alternate embodiment of the mounting apparatus, taken along line 14-14 in FIG. 12.
Figure 15:
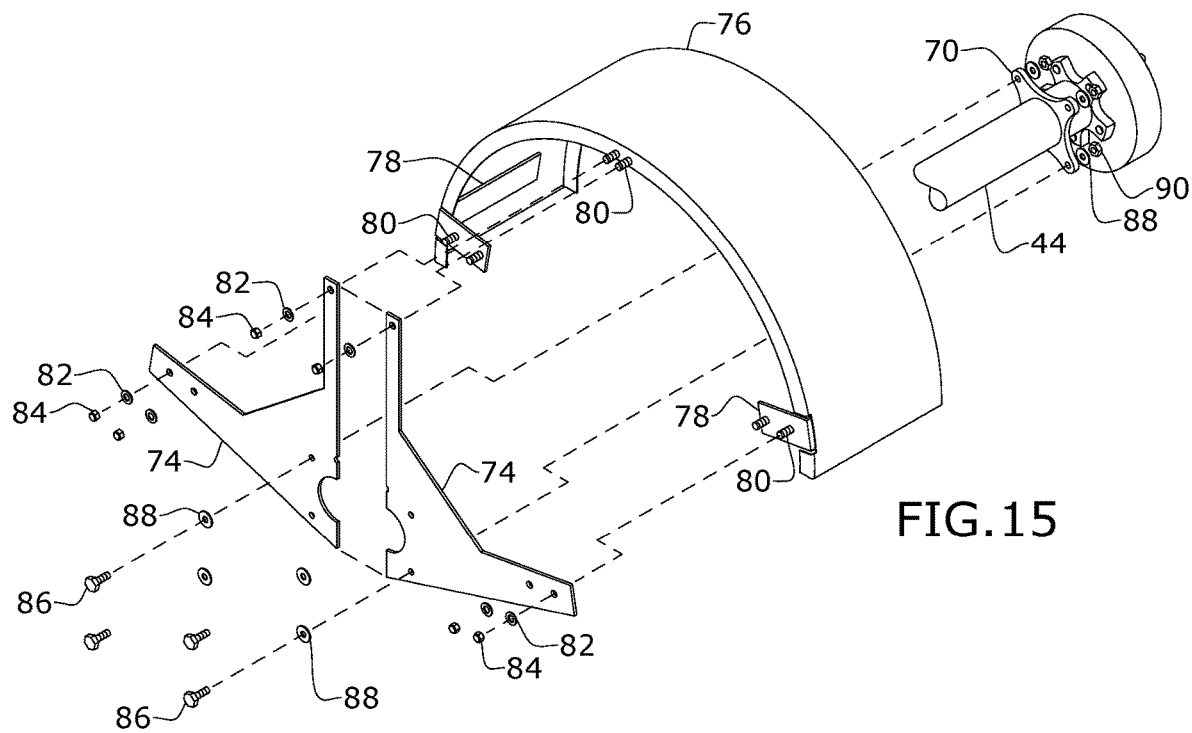
FIG. 15 depicts an exploded view of the second alternate embodiment of the mounting apparatus.
Figure 16:
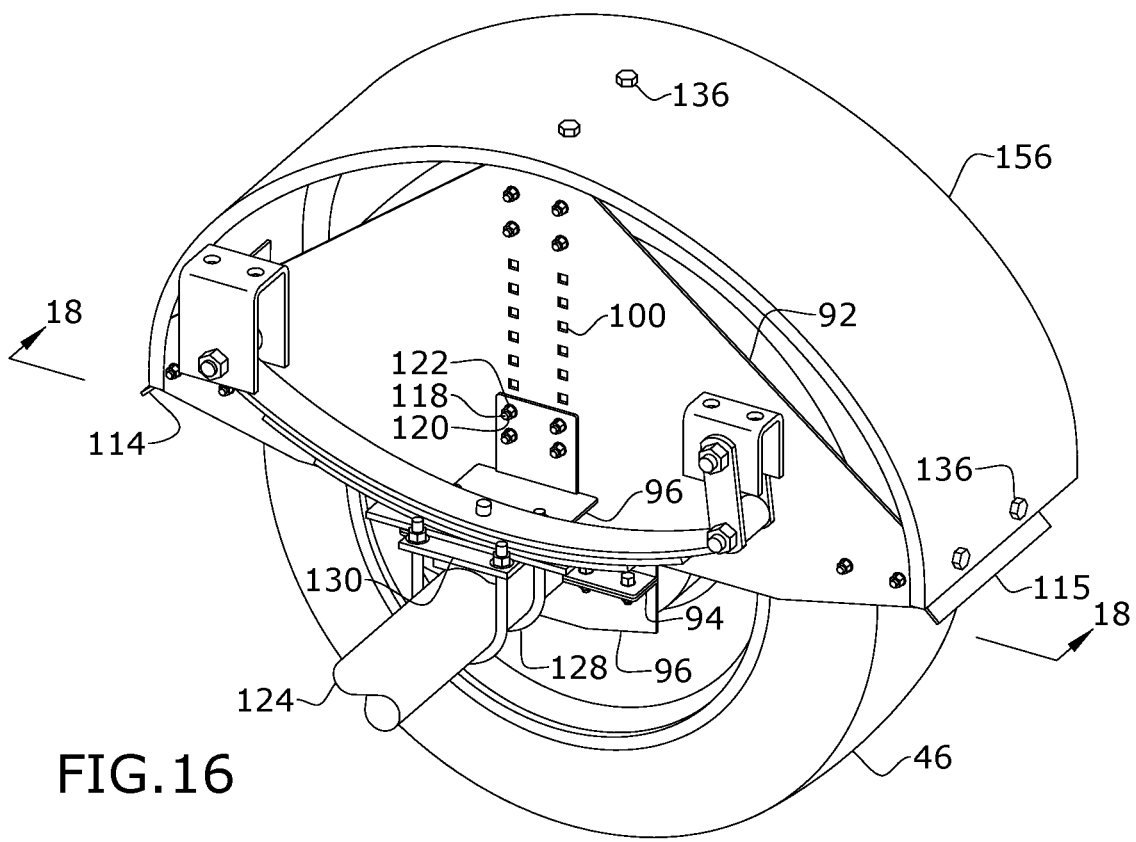
FIG. 16 depicts a perspective view of a third alternate embodiment of the mounting apparatus.
Figure 17:
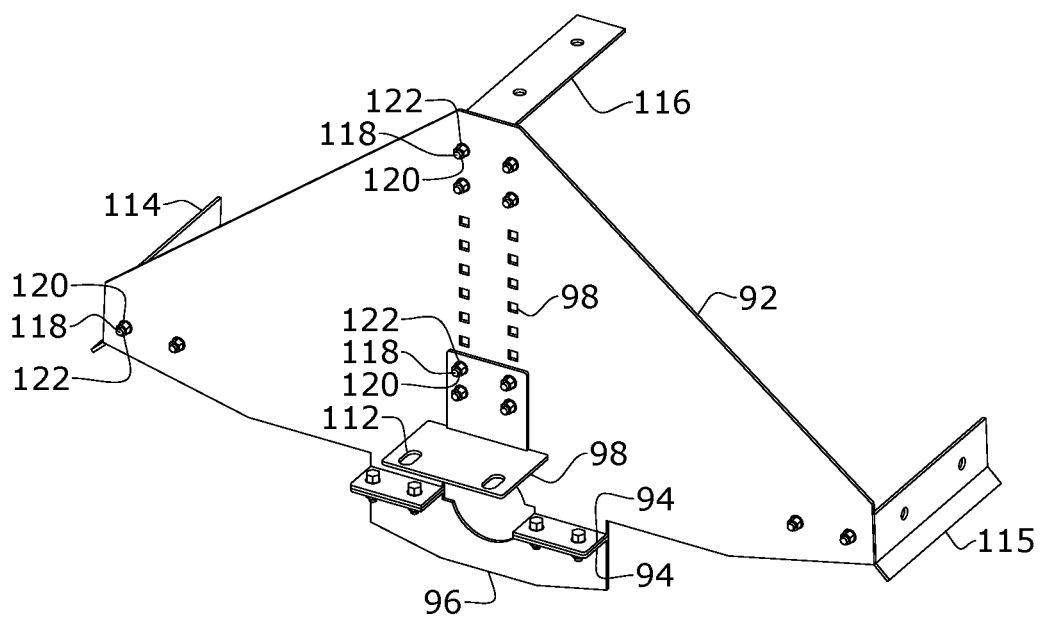
FIG. 17 depicts a perspective of a wing plate of the third alternate embodiment.
Figure 18:
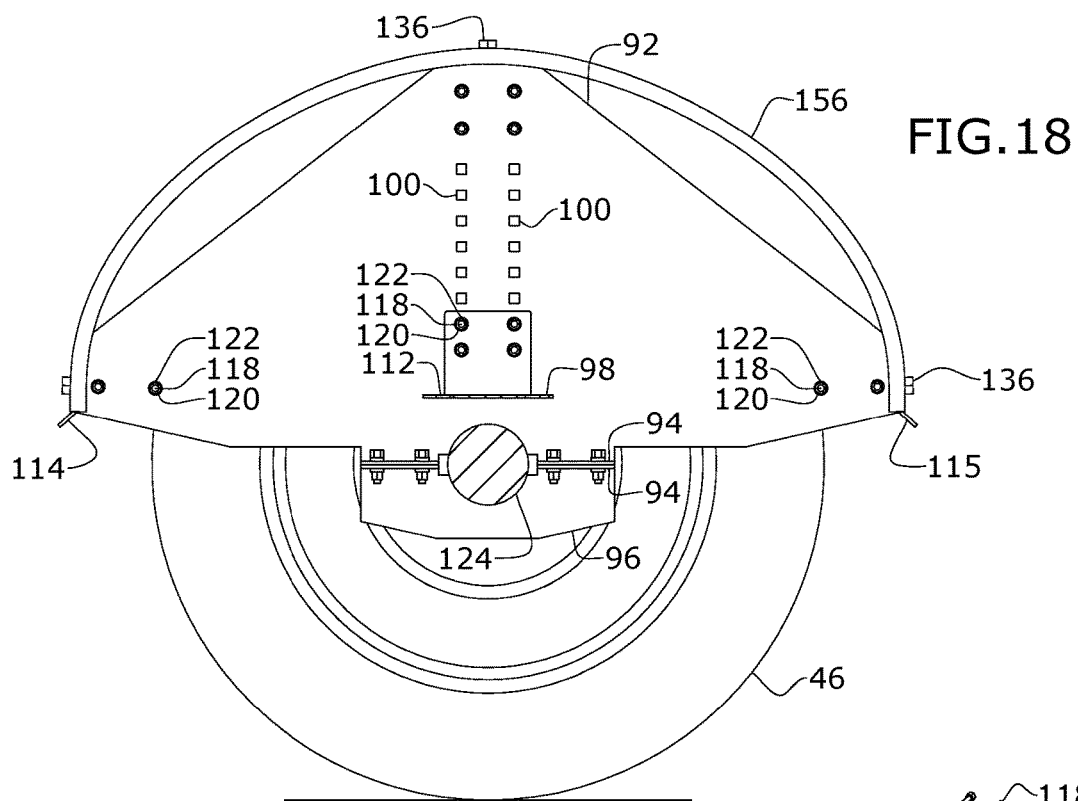
FIG. 18 depicts a section view of the third alternate embodiment of the mounting apparatus, taken along line 16-16 in FIG. 16.
Figure 19:
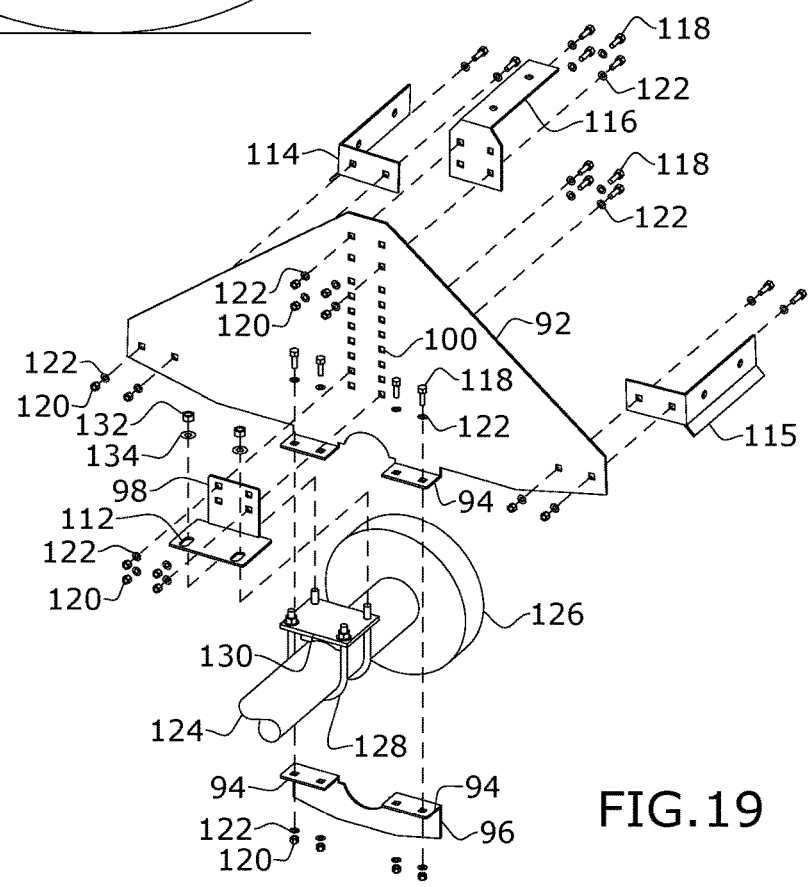
FIG. 19 depicts an exploded view of the third alternate embodiment of the mounting apparatus.
Figure 20:
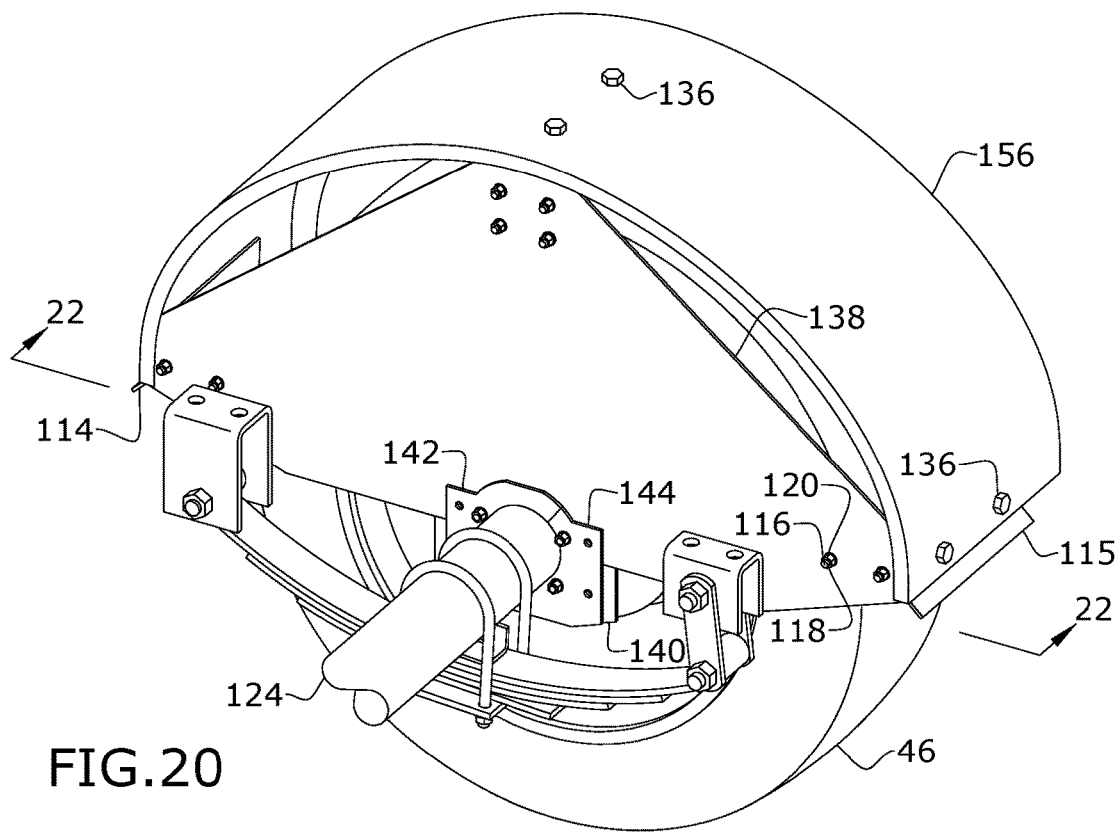
FIG. 20 depicts a perspective view of a fourth alternate embodiment of the mounting apparatus.
Figure 21:
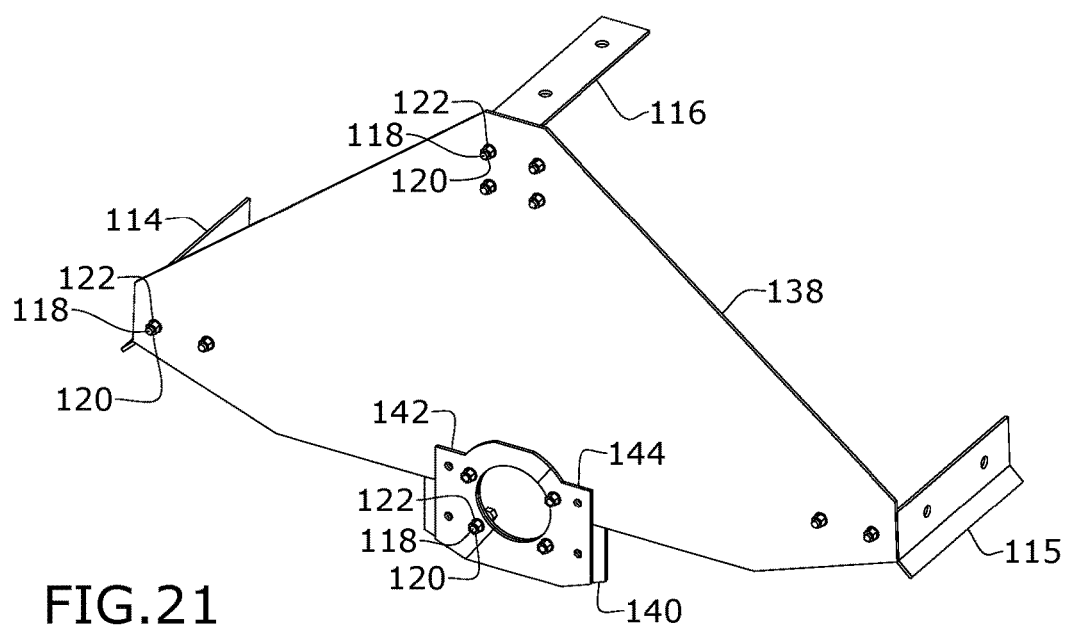
FIG. 21 depicts a perspective view of a wing plate of the fourth alternate embodiment.
Figure 22:
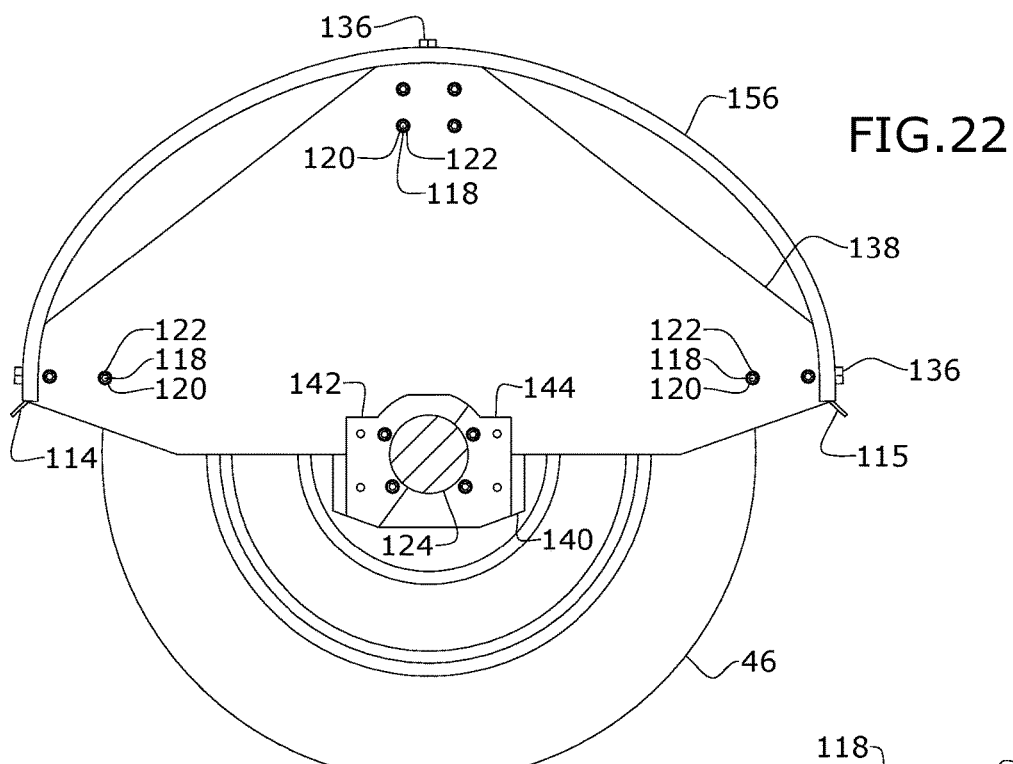
FIG. 22 depicts a section view of the fourth alternate embodiment of the mounting apparatus, taken along line 22-22 in FIG. 20.
Figure 23:
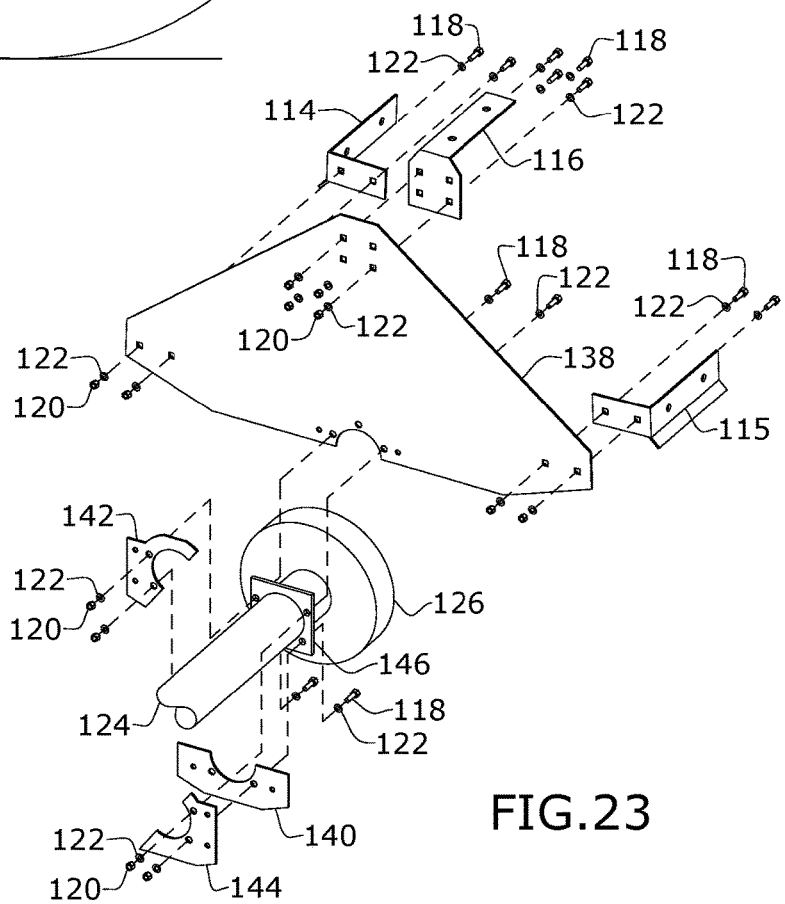
FIG. 23 depicts an exploded view of the fourth alternate embodiment of the mounting apparatus.
Figure 24:
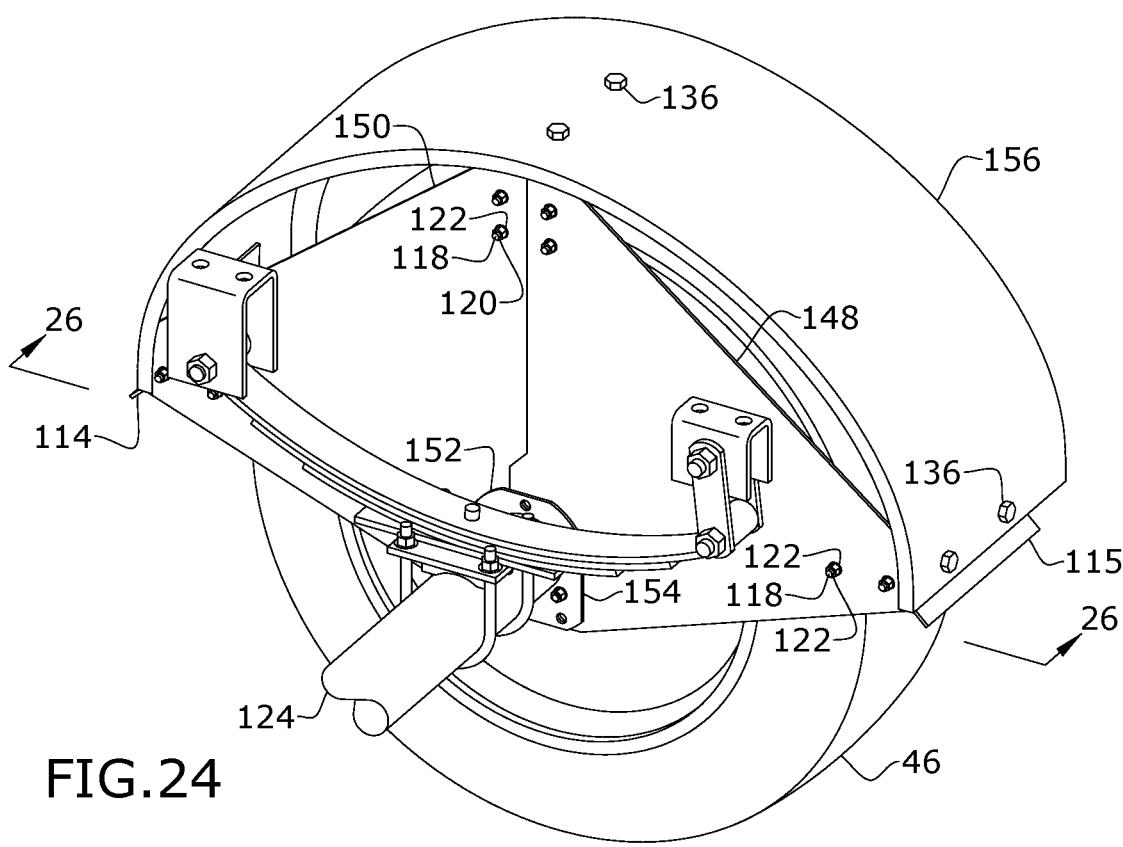
FIG. 24 depicts a perspective view of a fifth alternate embodiment of the mounting apparatus.
Figure 25:
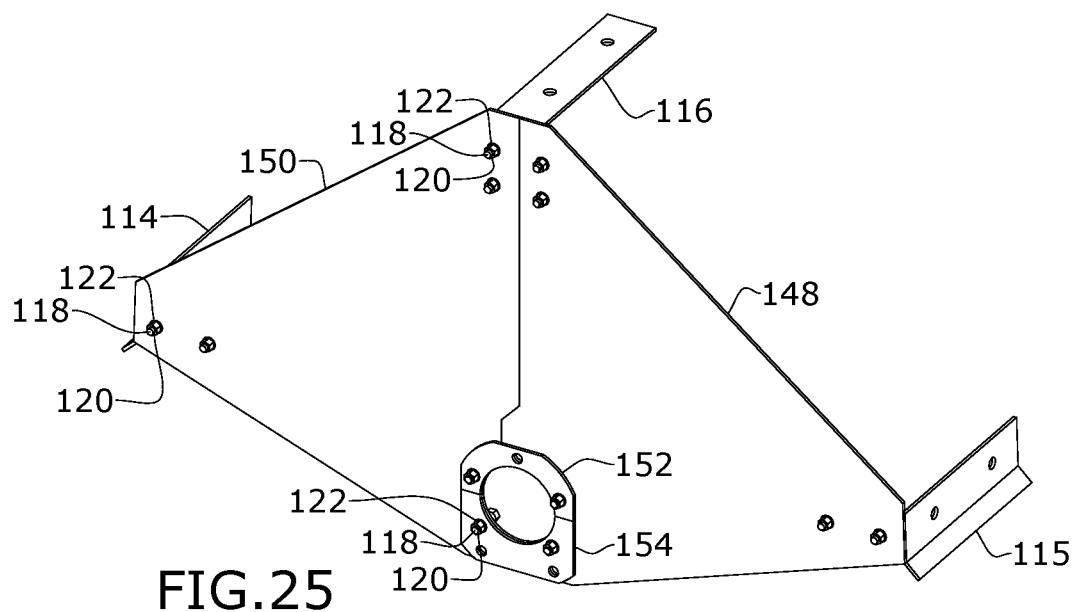
FIG. 25 depicts a perspective view of a wing plate of the fifth alternate embodiment.
Figure 26:
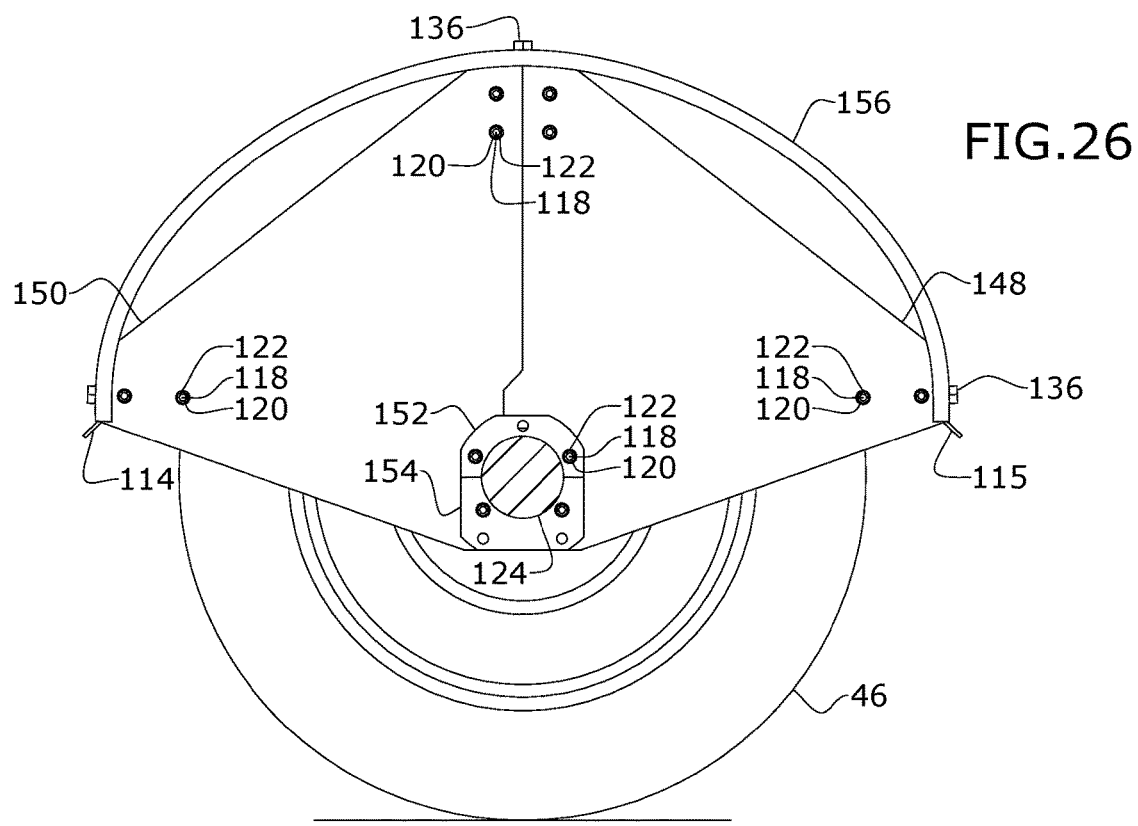
FIG. 26 depicts a section view of the fifth alternate embodiment of the mounting apparatus, taken along line 26-26 in FIG. 24.
Figure 27:
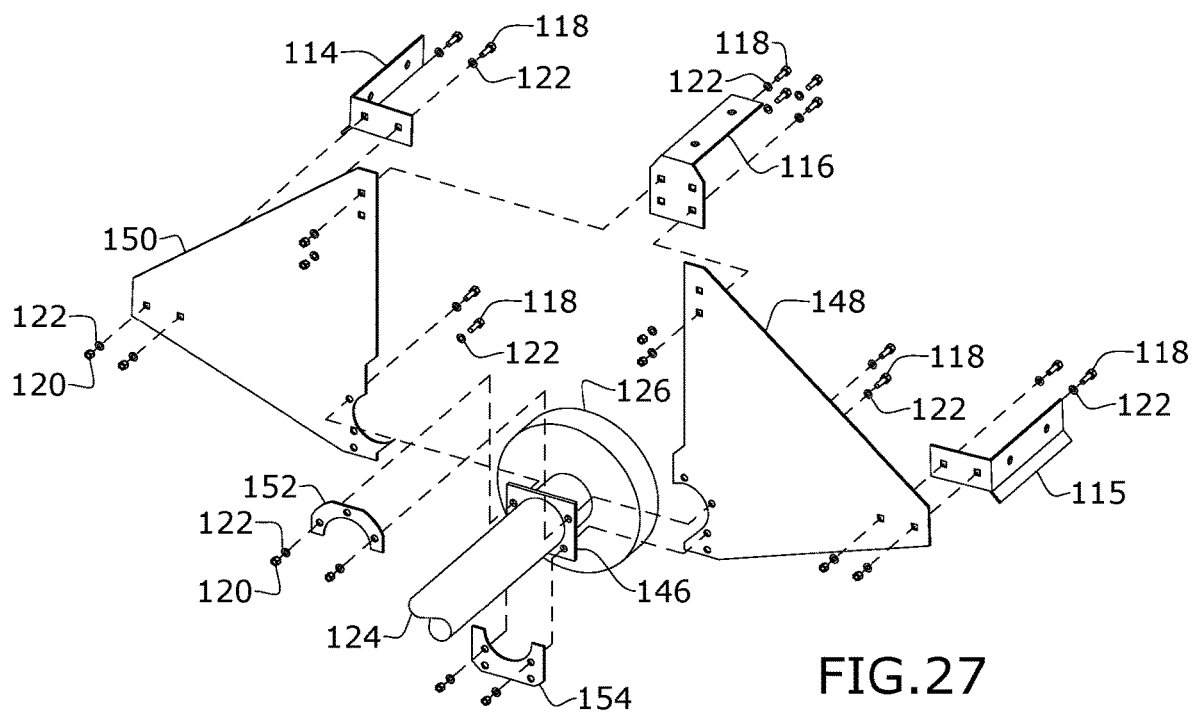
FIG. 27 depicts an exploded view of the fifth alternate embodiment of the mounting apparatus.

In embodiments as best depicted in FIGS. 13 and 15, a pair of L-brackets 78 may be welded to the interior wall of alternate fender 76. However, mechanical fasteners or other fastening components can be used in alternative embodiments to secure L-brackets 78 to alternate fender 76. Each back plate 74 may be coupled to one of the L-brackets 78 by L-bracket bolts 80, L-bracket washers 82 and L-bracket nuts 84. The top end of each back plate 74 may be coupled to an intermediate portion of alternate fender 76 by bolt 80, washer 82 and nut 84.

While the alternate back plate/bracket depicted in FIGS. 12-15 provides some shielding of the tire face, in further alternative embodiments an alternate back plate may be designed to provide more extensive shielding (e.g. at least about 30%, or at least about 40% of the inner tire face) to reduce or eliminate vacant space between the tire and the inside of the trailer wheel well and fender. In embodiments as depicted in FIGS. 16-27, a 'wing' type plate may cover approximately 40%-45% of the inner side face of the tire (or inner wheel well of the trailer). This reduction in space may be more effective in containing debris and may reduce or eliminate damage to the interior wheel well and exterior of the trailer. However, it shall be appreciated that various design and geometric configurations of the back plate may be employed without departing from the inventive concept.

As depicted in FIGS. 16-19, a third alternate embodiment may comprise an alternate back plate 92 which may generally have a 'wing' bracket type design (i.e. "wing plate" or "wing plate/bracket"), and may be secured to axle 124 behind brake drum 126 and/or in front of the leaf spring, according to various embodiments. The back plate 92 may also serve as a mounting apparatus to secure alternate fender 156 to axle 124 of the vehicle.

In embodiments, back plate 92 (upper wing plate) may comprise a lower semi-circular cutout, and may be secured to axle 124 via a lower wing plate 96 (lower wing plate bracket), comprising a corresponding upper semi-circular cutout, such that axle 124 is encircled within the cutouts. In embodiments, corresponding tabs 94 on lower wing plate 96 and back plate 92 may be attached via bolts 118, washers 122, and nuts 120 to mount the back plate 92 to axle 124.

In some embodiments, the back plate 92 may be coupled to the axle 124 via an axle U-bolt 128 and a U-bolt perch plate 130 that may attach to a U-bolt mounting plate 98. In embodiments, U-bolt mounting plate 98 includes a vertical member which couples to the back plate 92 through central mounting holes 114, 115 on the back plate 92 via bolts 118, nuts 120, and washers 122. The central mounting holes 114, 115 may provide height adjustment options for aligning the plate 92 with the U-bolt 128, as shown. The mounting plate 98 may further include a horizontal member which may couple directly to U-bolt 128, over U-bolt perch plate 130 via nuts 132 and washers 134. In embodiments, a second U-bolt 128 may provide a reinforced attachment of the U-bolt 128 and U-bolt perch plate 130.

Thus, this embodiment provides a winged back plate which includes tabs on the upper wing plate that pinch together with tabs on the lower wing plate, to wrap around the axle, and bolt directly to the U-bolt assembly.

In embodiments, the two attachment mechanisms, i.e. the U-bolt 128/U-bolt mounting plate 98; and lower wing plate bracket 96 provide a reinforced attachment of the back plate. It should be appreciated that other fastening components and/or attachment mechanism can be used in alternative embodiments to couple back plate 92 and axle 124.

In some embodiments, fender 156 may be secured to back plate 92 via brackets. In embodiments, a top L-bracket 116 may comprise plate mounting holes and fender mounting holes. The top L-bracket 116 may be secured around a top section of back plate 92 via bolts 118 engaged through corresponding top mounting holes on plate 92, and secured via nuts 120, and washers 122. Side L-brackets 114, 115 may likewise comprise plate mounting holes and fender mounting holes. The side L-brackets 114, 115 may be secured around a side section of back plate 92 via bolts 118 engaged through corresponding side mounting holes on plate 92, and secured via nuts 120, and washers 122. Fender 156 may then be attached via bolts 136 engaged through top and side mounting holes of the fender and corresponding fender mounting holes of the top L-bracket 116, and side L-brackets 114, 115, respectively, via nuts and bolts. However, other fastening components and/or mechanism can be used in alternative embodiments to couple fender 156 to back plate 92.

As depicted in FIGS. 20-23, a fourth alternate embodiment may comprise an alternate wing type back plate 138 which may be secured to axle 124 via an axle bracket 146, which may be a drum brake plate. In embodiments, axle bracket 146 may comprise a circular opening configured to receive axle 124. Back plate 138 may comprise a lower semi-circular cutout, including surround holes configured to attach to a front side of axle bracket 146 via bolts 118, engaged through corresponding holes of axle bracket 146, and reinforcement brackets 140, 142 and 144, and secured via nuts 120, and washers 122. In embodiments, bracket 140 may be a lower wing plate bracket, comprising an upper semi-circular cutout, corresponding to the lower semi-circular cutout of back plate 138, and may attach at a back side of axle bracket 146. Bracket 142 may be an upper diagonal C-plate bracket, and bracket 144 may be a lower diagonal C-plate bracket, wherein brackets 142 and 144 may comprise corresponding semi-circular cutouts, and may attach behind lower wing plate bracket 140 to encircle axle 124.

In some embodiments, fender 156 may be secured to back plate 138 via top L-bracket 116 and side L-brackets 114, 115. The brackets 114, 115, 116 may be attached to plate 138 via bolts 118 engaged through corresponding mounting holes on the plate and brackets, and secured via nuts 120, and washers 122. Fender 156 may then be attached via bolts 136 engaged through top and side mounting holes of the fender and corresponding fender mounting holes of the top L-bracket 116, and side L-brackets 114, 115, respectively, via nuts and bolts. However, other fastening components and/or mechanism can be used in alternative embodiments to couple fender 156 to back plate 138.

As depicted in FIGS. 24-27, a fifth alternate embodiment may comprise an alternate back plate, which may be a split wing type back plate comprising a right side plate 148 and a left side plate 150. In embodiments, the right side plate 148 may include a right semi-circular cutout, and the left side plate 150 may include a corresponding left side semi-circular cutout, which are configured to encircle axle 124 when the plates are adjoined. In embodiments, axle bracket 146 together with an upper C-plate 152 and a lower C-plate 154 may reinforce the attachment of right side plate 148 and left side plate 150 to axle 124. In some embodiments, right side plate 148 and left side plate 150 may be coupled to the front side of axle bracket 146, and upper and lower C-plates may be coupled to the back side of axle bracket 146, wherein the components may be secured via bolts 118 engaged through corresponding holes, and secured via nuts 120 and washers 122.

In embodiments, fender 156 may be secured to back plates 148 and 150 top L-bracket 116 and side L-brackets 114, 115. The brackets 114, 115, 116 may be attached to plates 148 and 150 via bolts 118 engaged through corresponding mounting holes on the plate and brackets, and secured via nuts 120, and washers 122. The top L-bracket 116 may comprise right side and left side plate mounting holes for attachment of the top L-bracket 116 to the right and left side plates 148, 150. In embodiments, fender 156 may further be attached via bolts 136 engaged through top and side mounting holes of the fender and corresponding fender mounting holes of the top L-bracket 116, and side L-brackets 114, 115, respectively, via nuts and bolts.

According to an exemplary embodiment, bracket 146 may be a 4 or 5-hole axle bracket on the rear brake drum plate. Bolts may be, for example, ⅜-inch carriage bolts (however, lengths may vary depending on mounting position of brackets). In embodiments, the fender may be a 16-gauge steel fender.

According to an exemplary embodiment, a wing plate bracket system may be mounted by removing the wheel from the trailer and wrapping the wing plate/bracket components around the trailer axle. Depending on the wing system type, the right and left or top and bottom sides of the wing plate may be coupled directly around the axle using reinforcement bracket(s). The bolts on either the axle bracket or U-bolt (depending on which wing system is used) may be removed. The wing plate/bracket mounting holes may then be aligned with the trailer axle holes and the wing brackets bolts may be attached to the same locations where the previous bolts were removed. The reinforcement brackets may then be attached to the wing plate/bracket around the trailer. Once the wing plate/bracket has been mounted, L brackets may be attached to the wing plate with hardware (bolts, nuts, washers) to left, right and top sides of the wing plate). The steel fender may thereafter be attached to the L-brackets, and the bolts may be tightened. The assembly may preferably be checked for proper clearance, wherein the system may be adjusted by loosening the bolts slightly to adjust, and retightening. In further embodiments, the bracket and fender positioning and tightness of the bolts may be checked regularly after towing and/or after each usage, wherein appropriate adjustments may be made if needed.

According to an exemplary embodiment, a wing bracket/plate system may be manufactured using 10-gauge metal sheets. Each individual part may be cut using a water jet cutting system for the wing brackets and other components. Once all components are cut, each piece may be inserted into a brake press to make all necessary 90-degree bends in the correct locations to ensure proper fit within the RV trailer wheel compartments and alignment. CAD designed diagrams may be used for each part involved to assemble the system.

The system may be designed according to precise dimensions, including dimensions of all additional hardware (e.g. bolts, spacers if needed), due to limited area of installation. Variances in measurements for size of trailer axles (by weight and diameter) and braking systems on trailer axles for placement of mounting and brake line holes in appropriate locations may further be determined. Thus, the system may be precisely designed to ensure proper fit for effective protection and safety functionality. Additionally, the size and shape of the wing bracket may be determined to ensure optimal protection from debris and allow brake cooling while the vehicle/trailer is being towed. Adjustments may be made to fit various trailer designs.

Thus, the above configurations may utilize a mounting element such as a U-bolt and/or mount directly to the drum brake plate/axle bracket. The different configurations may accommodate various trailer designs, including wheel well areas of the trailers and access to mount and remove the system (e.g. if needed after a tire blowout).

In embodiments, the disclosed system may enable the protective plate and/or protective steel fender, to be mounted to each individual tire moving independently of all other tires and axles. In further embodiments, the disclosed system may be used for any axle combination including single, tandem, triple axle, etc.

In embodiments, the protective components of the mounting apparatus may comprise 10-gauge steel. However, it shall be appreciated that the components of the disclosed system including mounting apparatuses described in embodiments of the invention can be made from any materials including, but not limited to, various metals, plastics, wood or other materials. In alternative embodiments, the number and type of fasteners, brackets or other components used in conjunction with the mounting apparatus to secure the back plate and fender to the axle of the vehicle can vary.

A high speed road test was conducted, with a tire blowing out at 65 mph, using a wing-type plate which covered approximately 40%-45% of the inner tire face (inner wheel well of the trailer), and a fender which covered about 50% of the rotating tire. The tested system proved highly effective as the trailer remained completely undamaged.

It shall be appreciated that the components of the mounting apparatus described in several embodiments herein may comprise any alternative known materials in the field and be of any color, size and/or dimensions. It shall be appreciated that the components of the mounting apparatus described herein may be manufactured and assembled using any known techniques in the field. Terms such as 'approximate,' 'approximately,' 'about,' etc., as used herein indicate a deviation of within +/−15%.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A system for protecting a vehicle comprising:
   one or more back plates that form a lower semi-circular cutout that is configured to receive an axle of the vehicle, the one or more back plates being configured to cover a portion of a back side of a tire connected to the axle;
   a lower wing plate bracket that forms an upper semi-circular cutout that is configured to receive the axle of the vehicle opposite the lower semi-circular cutout;
   a first C-plate bracket and a second C-plate bracket, the first and second C-plate brackets forming opposing semi-circular cutouts that are configured to receive the axle, the first and second C-plate brackets being configured to couple to and reinforce the one or more back plates and the lower wing plate; and
   a fender that is supported by the one or more back plates, the fender being configured to extend around an upper portion of the tire.

2. The system of claim 1,
   wherein the one or more back plates, the lower wing plate bracket, the first C-plate bracket, and the second C-plate bracket are configured to be secured to an axle bracket.

3. The system of claim 2, wherein the axle bracket extends around the axle.

4. The system of claim 3, wherein the axle bracket forms a circular opening that receives the axle.

5. The system of claim 2, wherein the first and second C-plate brackets are secured to a back side of the axle bracket.

6. The system of claim 1, wherein the first and second C-plate brackets are configured to couple to a back side of the one or more back plates and the lower wing plate.

7. The system of claim 1, wherein the one or more back plates, the lower wing plate bracket, the first C-plate bracket and the second C-plate bracket are configured to be secured to a drum brake plate.

8. The system of claim 1, wherein the first C-plate bracket is an upper diagonal C-plate bracket and the second C-plate bracket is a lower diagonal C-late bracket.

9. A system for protecting a vehicle comprising:
   one or more back plates that are configured to be secured to an axle of the vehicle, the one or more back plates covering a portion of a back side of a tire connected to the axle; and
   a fender that is supported by the one or more back plates, the fender extending around an upper portion of the tire;
   wherein the one or more back plates are secured to the axle via an axle bracket and C-plate brackets.

10. The system of claim 1, wherein the one or more back plates are also secured to the axle via a drum brake plate.

11. The system of claim 1, wherein the one or more back plates comprise a single back plate.

12. The system of claim 9, wherein the C-plate brackets comprise an upper diagonal C-plate bracket and a lower diagonal C-plate bracket.

13. The system of claim 9, wherein the C-plate brackets comprise opposing semi-circular cutouts that are configured to receive the axle.

14. The system of claim 9, wherein the C-plate brackets are secured to a back side of the axle bracket and the one or more back plates are secured to a front side of the axle bracket.

* * * * *